Oct. 22, 1957  CARL-ERIK GRANQVIST  2,810,843
ALTERNATING CURRENT MOTOR
Filed Oct. 4, 1956

INVENTOR
CARL-ERIK GRANQVIST

United States Patent Office

2,810,843
Patented Oct. 22, 1957

2,810,843

ALTERNATING CURRENT MOTOR

Carl-Erik Granqvist, Lidingo, Sweden, assignor to Svenska Aktiebolaget Gasaccumulator, Lidingo, Sweden, a corporation of Sweden Application October 4, 1956, Serial No. 613,999

Claims priority, application Sweden October 20, 1955

5 Claims. (Cl. 310—68)

The present invention refers to an alternating current motor, which is particularly suitable for driving a gyroscope rotor.

For the driving of a gyro motor it is usual to employ alternating current, since the construction of a rapidly rotating direct current engine is connected with some difficulty. This applies particularly to the collectors, at which brush wear and arcing causes the servicing interval to be short. Furthermore, the D. C. field created in a D. C. engine may influence the stability of the gyroscope. In vehicles, such as aircraft or ships, D. C. current is however available and it is therefore necessary to convert by means of a generally rotating converter the direct current into the alternating current required for driving the motor. The converter is usually designed to yield a 400 c./s. 3-phase alternating current, which is suitable for driving a gyro motor. However, the use of a rotating converter brings about a further increase in the load of the vehicle, for instance an aircraft; also, three connecting leads are required for feeding the current to the gyro motor, which increase the frictional resistance of the gimbal mounting of the gyroscope. Electronic tube converters have not been applicable, owing to their low efficiency and inability to operate at low voltages.

According to the present invention a transistor converter is utilized for converting the direct current into alternating current for driving the motor and according to an essential characteristic of the invention, the stator winding of the motor forms the oscillator coils required for the transistor converter. This has several advantages. For instance, no special oscillator coils are required for the transistor converter, such coils being comparatively bulky. In addition, if the transistors together with the remaining circuit elements are built into the gyro housing, the connection to the voltage source can be made through only two connecting leads, so that no slip rings or similar devices are required. The use of transistors in the converter further makes it possible to construct a converter of high efficiency, which can be connected to comparatively low voltages.

Figure 1:
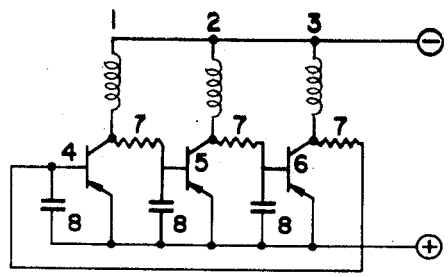
Figure 2:
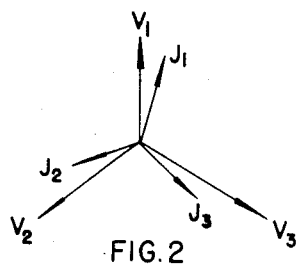
Figure 3:
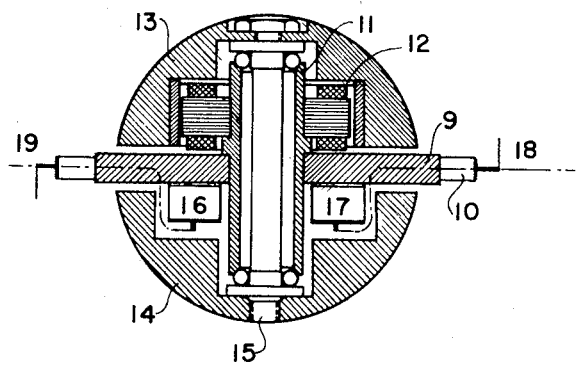
Figure 4:
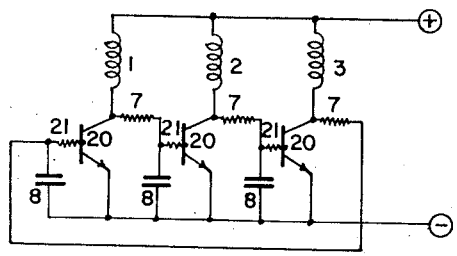
Figure 5:
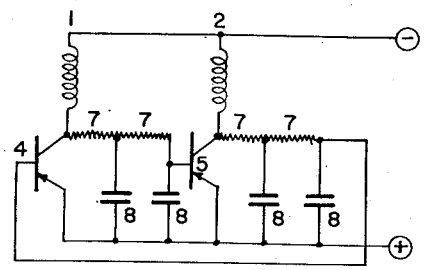

The invention will be described in the following with reference to the annexed drawing: Fig. 1 of which shows a circuit diagram of the arrangement; Fig. 2 shows a diagram explaining the operation thereof; Fig. 3 a section through a gyroscope according to the invention; Fig. 4 is a circuit diagram using transistors of a different polarity and Fig. 5 is a circuit diagram with a two phase current supply.

Fig. 1 shows a transistor converter for producing a 3-phase alternating current, the oscillator coils of the converter forming the stator windings of a 3-phase motor, this motor comprising the three stator windings 1, 2 and 3, which are connected together in a Y-arrangement. The junction between the three windings is connected to the negative terminal of a D. C. source and the free end of each winding is connected with the collector electrode of a transistor 4, 5 and 6. These transistors are connected in a grounded emitter arrangement, so that the emitter electrodes are thus connected to a positive terminal of the D. C. source. Furthermore, the transistors are connected mutually in cascade over phase-delay networks comprising resistors 7 and condensers 8, these elements substantially determining the frequency of the alternating current delivered by the converter. Through these networks suitable control current for the base electrodes of the transistors is also applied. As is apparent from the figure, the base electrode of a following transistor is connected over the resistor 7 of the network to the collector electrode of a preceding transistor, the first transistor of the series being furthermore connected in the same manner to the last transistor so as to form a loop-coupled converter.

If the voltages across the coils 1, 2 and 3 are designated $V_1$, $V_2$ and $V_3$, the currents $I_1$, $I_2$ and $I_3$ through the coils will lag somewhat behind the voltage in phase, as shown by Figure 2. The phase-delay elements therefore must have a delay of somewhat more than 60°.

When some types of transistors are used, it may be suitable to insert also a resistor in series with the base connection such as shown at 21 in Fig. 4. It is also possible to use transistors of different polarity as shown at 20 in Fig. 4, as it is also possible to use a 2-phase system as in Fig. 5 if the motor is designed correspondingly. A 3-phase system, however, has the great advantage of causing no alternating voltages to appear across the D. C. connection, since the momentary value of all the currents is zero.

The greatest difficulty in the design of a gyroscope lies in reducing the friction of the gimbal mountings to a sufficiently low value. This implies, among other things, that the number of electric connections between the gyro housing and the gimbal rings should be reduced to the lowest possible number. If a circuit according to Fig. 1 is used and the transistors are mounted outside the gyro housing, four electric connections are required for the purpose. However, the number may be reduced to two if the transistors are built into the gyro housing, in which the remaining circuit elements necessary for the transistor converter are also placed.

The gyroscope shown in Fig. 3 comprises a suitably circular disk 9, which is provided with pivots 10 for its suspension in a gimbal ring not shown in the drawing. A bearing case 11 is pressed into a central hole provided in the disk 9. Pressed onto the bearing case is the stator with the stator windings 12. The gyroscope rotor comprises a pair of cup members 13 and 14, which are held together by an axle 15, which is mounted in the bearing case 11 by means of roller bearings. The circuit elements of the transistor converter, represented in the drawing by two transistors 16 and 17, are further attached to the stator disk 9. The connection between the transistor converter and the voltage source is through the leads shown in dash lines on the drawing and through point contacts 18 and 19, a part of which is connected with the pivot 10 and another part of which is connected with the gimbal ring, in which the pivot 10 is mounted. In this way only two connecting leads are obtained between the gyro housing and the gimbal ring. This can be constructed with points resting on laminar springs in such a way that no noticeable friction forces are introduced, which could affect the movements of the gyroscope.

The decisive factor for the quality of a gyroscope is its moment of momentum, which is the moment of inertia multiplied by the angular velocity of the rotor. As there is, at least in the case of aircraft instruments, only a limited amount of space available, it is imperative to place the non-rotating parts in as small a distance as possible from the axis of rotation in order to obtain the smallest possible decrease in the moment of inertia. For this reason, the transistors and their circuit elements have been placed in the gyroscope according to Fig. 3 as close to the centre of rotation as possible.

What is claimed is:

1. Alternating current motor, characterized in that a stator winding forms the oscillator coils of a transistor converter for converting direct current into alternating current for driving the motor.

2. Alternating current motor according to claim 1 and mounted in a gyro housing, characterized in that the transistors are built into the gyro housing whereby only two connections between the gyro housing and the gimbal ring are required for the supply of current to the motor.

3. Alternating current motor according to claim 1, characterized in that the transistor converter is designed to yield 3-phase alternating current, whereby no A. C. voltage is obtained across the D. C. source.

4. Alternating current motor according to claim 1, characterized in that the circuit elements of the transformer converter are placed close to the centre of rotation of the motor in order to obtain the largest possible moment of inertia within a given space.

5. Alternating current motor according to claim 1, characterized in that the stator, which forms the gyro housing, comprises a disk journalled in the gimbal ring and around which the rotor is arranged essentially symmetrically in the form of a pair of cup members.

No references cited.